2,762,848

PROCESS FOR CHLORINATING ARYLNITROALKENES

Arnold N. Johnson, Fairlawn, N. J., assignor to Commercial Solvents Corporation, Terre Haute, Ind., a corporation of Maryland No Drawing. Application April 17, 1953, Serial No. 349,577

4 Claims. (Cl. 260—646)

My invention relates to a new process for chlorinating arylnitroalkenes. More particularly, it relates to a new process for the production of 1-aryl-2-nitro-1,2-dichloroalkanes by the addition of chlorine to the olefinic bond of the 1-aryl-2-nitro-1-alkenes.

It is known that the addition of bromine to the olefinic bond of arylnitroalkenes proceeds rapidly and essentially to completion when conducted in the presence of actinic light. However, attempts to add chlorine to this double bond of arylnitroalkenes higher than the ethylenes by photochemical means have been uniformly unsuccessful. Likewise, attempts to so chlorinate these higher arylnitroalkenes by means of gaseous chlorine alone have also been unsuccessful.

The object of my invention is to provide a process by which 1-aryl-2-nitro-1-alkenes may be readily chlorinated at the olefinic bond by gaseous chlorine to form the 1-aryl-2-nitro-1,2-dichloroalkanes. My new process consists of reacting an arylnitroalkene with gaseous chlorine in the presence of an aqueous solution of an alkali metal hydroxide at from about 0 to about 45° C., allowing the reaction to proceed to equilibrium, separating and recovering the arylnitrodichloroalkanes formed.

My new chlorination process involves the reaction of a large excess of gaseous chlorine with the desired 1-aryl-2-nitro-1-alkene in the presence of an aqueous solution of from about 0.5 to about 5 moles of an alkali metal hydroxide per mole of the 1-aryl-2-nitro-1-alkene used. The alkali metal hydroxides sodium hydroxide and potassium hydroxide function equally well in my process. The alkali metal hydroxide is employed in an amount to form a solution ranging from about 1% to about 15%. A more concentrated solution than about 15% is to be avoided to prevent the precipitation of sodium chloride during the reaction. The 1-aryl-2-nitro-1-alkene is dispersed in from 5 to 20 volumes of a solution of an alkali metal hydroxide. During the period of admission of gaseous chlorine the reaction mixture is maintained at a temperature of from 0° to 45° C. by cooling. A flow rate of approximately 1 mole per hour of gaseous chlorine per mole of alkali metal hydroxide used is maintained for from 2–6 hours.

After the addition of the chlorine has been completed the reaction mixture is allowed to stand at room temperature for from 6–72 hours so that the reaction may essentially reach equilibrium. During this period of time the reaction mixture is allowed to remain in a decidedly acid condition. After equilibrium has been reached the reaction mixture consists of two layers, the desired 1-aryl-2-nitro-1,2-dichloroalkane being present in the lower, oily layer. The reaction mixture is made alkaline with sodium or potassium hydroxide and the layers separated by decantation. The lower or oily layer is then washed in water and filtered to remove any solids present. Upon drying a very viscous oil consisting essentially of the desired 1-aryl-2-nitro-1,2-dichloroalkane is obtained.

The time required for the reaction mixture to reach equilibrium varies with the various arylnitroalkenes to be chlorinated. The 1-aryl-2-nitroethenes have, for example, been found to reach essential equilibrium at the end of the chlorination period. However, the 1-aryl-2-nitro-1-propenes and higher homologues require a longer period to reach equilibrium. In the cases of arylnitroalkenes such as 1-aryl-2-nitro-1-pentenes and 1-aryl-2-nitro-1-butenes I prefer to allow the reaction mixture to stand from 18–24 hours to reach equilibrium. The 1-aryl-2-nitro-1-alkenes for use in my described process include: 1-phenyl-2-nitro-1-propene, 1-phenyl-2-nitro-1-butene, 1-phenyl-2-nitro-1-pentene, 1-phenyl-2-nitro-1-hexene, 1-phenyl-2-nitroethene, 1-tolyl-2-nitroethene, 1-tolyl-2-nitro-1-propene, 1-tolyl-2-nitro-1-butene, 1-tolyl-2-nitro-1-pentene, 1-tolyl-2-nitro-1-hexene, and the 1-phenyl-2-nitro-1-alkenes and 1-tolyl-2-nitro-1-alkenes wherein the aryl groups are mono- or poly-halogen substituted.

Among the materials which are produced by the use of my new process are included: 1-phenyl-2-nitro-1,2-dichloroethane, 1-phenyl-2-nitro-1,2-dichloropropane, 1-phenyl-2-nitro-1,2-dichlorobutane, 1-phenyl-2-nitro-1,2-dichloropentane, 1-phenyl-2-nitro-1,2-dichlorohexane, 1-tolyl-2-nitro-1,2-dichloroethane, 1-tolyl-2-nitro-1,2-dichloropropane, 1-tolyl-2-nitro-1,2-dichlorobutane, 1-tolyl-2-nitro-1,2-dichloropentane, 1-tolyl-2-nitro-1,2-dichlorohexane, and 1,2-dichlorides of 1-phenyl-2-nitroalkenes and 1-tolyl-2-nitroalkenes wherein the aryl groups are mono- or poly-halogen substituted.

The products of my new process are useful as insecticides and as starting materials for the synthesis of other insecticides.

My new process is illustrated by the following examples. I do not wish to be limited to the conditions and amounts specified therein, but my invention is defined in the scope of this specification and attached claims.

Example I

In an 800-ml. beaker were mixed 43.8 grams (.272 mole) of purified 1-phenyl-2-nitro-1-propene and a solution of 33 grams of potassium hydroxide in 400 ml. of water. Gaseous chlorine was passed into this mixture for a period of four hours at the rate of approximately 40 gm. per hour. During the course of the chlorination reaction the temperature was maintained at from 5–9° C. At the end of the four hour period there were finely dispersed solids present but little evidence of an appreciable oily layer. The reaction mixture was allowed to stand at room temperature for a period of about sixteen hours. At the end of this time a pronounced green, oily, lower layer had separated. The entire reaction mixture was made alkaline by the addition of sodium hydroxide and shaken in the alkaline solution. The layers were separated, the lower, oily layer washed in water and filtered. Thirty-six grams of wet oily product were recovered from the lower layer of the reaction mixture. This product when dried by removing the water as a benzene-water azeotrope and the residual benzene in a vacuum desiccator, constituted 28.8 grams of a heavy viscous oil containing the desired 1-phenyl-2-nitro-1,2-dichloropropane. The 36 grams of wet product first recovered represented a yield of 57.0% of theoretical.

Example II

In an 800-ml. beaker 74.0 grams (.496 mole) of 1-phenyl-2-nitroethene was mixed with a solution of 74 grams of sodium hydroxide in 500 ml. of water. Gaseous chlorine was passed into this mixture at a rate of approximately 40 gm. per hour for four hours. The temperature of the reaction mixture was maintained at from 12–19° C. for the first two-hour period and at from 4–6° C. for the second two-hour period. At the end of the chlorination the reaction mixture contained two separate layers, the lower, oily layer containing the desired product. The layers were separated by decantation and the unreacted chlorine removed from the lower layer by washing with a 10% potassium iodide solution followed by a 10% potassium thiosulfate solution. The resulting washed lower layer was then filtered. A small amount of solid matter was removed by filtration and the oily filtrate dried by means of sodium sulfate. There was thus obtained 38.4 ml. of a viscous oil weighing 53.2 grams which was extremely lachrymatory and which was identified as 1-phenyl-2-nitro-1,2-dichloroethane.

*Example III*

In an 800-ml. beaker 37.2 grams (0.25 mole) of 1-phenyl-2-nitroethene was mixed with a solution of 33.0 grams of potassium hydroxide in 250 ml. of water. Gaseous chlorine was passed into this mixture at a rate of approximately 40 gm. per hour for 135 minutes while maintaining the reaction mixture at 10° C. At the end of the chlorination period the reaction mixture consisted of two phases. The reaction mixture was made alkaline with sodium hydroxide, the layers separated by decantation, the lower layer washed with water, and filtered. After filtration there was obtained 37.8 grams (.172 mole) of a viscous oil identified as 1-phenyl-2-nitro-1,2-dichloroethane.

Now having described my invention, what I claim is:

1. In a process for the chlorination of arylnitroalkenes the steps which comprise reacting a 1-aryl-2-nitro-1-alkene in which the aryl radical is one selected from the group consisting of phenyl, tolyl, halophenyl, halotolyl, polyhalophenyl, and polyhalotolyl and in which the alkene chain contains from 2 to 6 carbon atoms with gaseous chlorine in the presence of an alkali metal hydroxide at a temperature ranging from about 0 to 45° C., and separating and recovering the corresponding 1-aryl-1,2-dichloro-2-nitroalkane.

2. In a process for the chlorination of arylnitroalkenes the steps which comprise reacting a 1-aryl-2-nitro-1-alkene in which the aryl radical is selected from the group consisting of phenyl, tolyl, halophenyl, halotolyl, polyhalophenyl, and polyhalotolyl and in which the alkene radical contains from 2 to 6 carbon atoms with gaseous chlorine in the presence of an aqueous solution of an alkali metal hydroxide at a temperature ranging from about 0 to 45° C., allowing the reaction to proceed essentially to equilibrium, and separating and recovering the corresponding 1-aryl-1,2-dichloro-2-nitroalkane.

3. In a process for the chlorination of 1-phenyl-2-nitroethene the steps which comprise reacting the 1-phenyl-2-nitroethene with gaseous chlorine in the presence of an aqueous solution of an alkali metal hydroxide at from about 0° C. to about 45° C., separating and recovering the 1-phenyl-2-nitro-1,2-dichloroethane formed thereby.

4. In a process for the chlorination of 1-phenyl-2-nitro-1-propene the steps which comprise reacting the 1-phenyl-2-nitro-1-propene with gaseous chlorine in the presence of an aqueous solution of an alkali metal hydroxide at from about 0° C. to about 45° C., allowing the reaction to proceed essentially to equilibrium, and separating and recovering the 1-phenyl-2-nitro-1,2-dichloropropane formed thereby.

References Cited in the file of this patent

UNITED STATES PATENTS 2,474,590    Morey _____ June 28, 1949

OTHER REFERENCES

Priebs "Justus Liebig's Annalen der Chemie" Band 225, pp. 344–345 (1884).